United States Patent [19]
Patte et al.

[11] Patent Number: 5,980,083
[45] Date of Patent: Nov. 9, 1999

[54] MACHINE AND METHOD FOR POSITIONING TIRE BEADS

[75] Inventors: Bernard Patte, Ceyrat; Antoine Wrobel, Lempdes, both of France

[73] Assignee: Compagnie Générales des Etablissements Michelin - Michelin & CIE, Clermont-Ferrand, France

[21] Appl. No.: 08/945,510

[22] PCT Filed: Apr. 16, 1996

[86] PCT No.: PCT/EP96/01589

§ 371 Date: Oct. 24, 1997

§ 102(e) Date: Oct. 24, 1997

[87] PCT Pub. No.: WO96/33877

PCT Pub. Date: Oct. 31, 1996

[30] Foreign Application Priority Data

Apr. 26, 1995 [FR] France .................................. 95 05098

[51] Int. Cl.$^6$ ......................... G06F 17/00; B60C 25/135; B60C 25/138
[52] U.S. Cl. ..................................... 364/468.01; 157/1.26; 157/1.28
[58] Field of Search ....................... 364/468.01; 157/1.24, 157/1.26, 1.28

[56] References Cited

U.S. PATENT DOCUMENTS

| | | | |
|---|---|---|---|
| 3,978,903 | 9/1976 | Mueller et al. ........................... | 157/1.2 |
| 4,262,727 | 4/1981 | Schifferly ................................ | 157/1.24 |
| 4,547,945 | 10/1985 | Lawson ..................................... | 29/407 |
| 4,947,919 | 8/1990 | Timlin ..................................... | 157/1.24 |
| 5,141,040 | 8/1992 | Curcuri ................................... | 157/1.17 |
| 5,267,380 | 12/1993 | Ronge et al. ............................... | 29/33 |
| 5,659,478 | 8/1997 | Pennisi et al. ....................... | 364/468.01 |

FOREIGN PATENT DOCUMENTS 3442561  5/1986  Germany .
 819878  9/1959  United Kingdom .

*Primary Examiner*—William Grant
*Assistant Examiner*—Iván Calcaño
*Attorney, Agent, or Firm*—Baker & Botts, L.L.P.

[57] ABSTRACT

In order to rationalize and make profitable the use of machines for positioning the beads of tires for finishing mounted, deliverable assemblies, the machine according to the invention comprises two plates (10), one upper and one lower, each provided with at least two cylindrical rings (4), of different diameters and axially movable independently, and also means (3, 5, 7, 11, 12, 13) which, according to the dimension of the tire of the mounted assembly E to be treated, permit the selection of the appropriate rings (4', 4"), and the adjustment of the axial distance necessary between rings, and sufficient to obtain the desired compression of the sidewalls of the tire, after application of said rings to the sidewalls of the tire of the assembly E.

8 Claims, 4 Drawing Sheets

MACHINE AND METHOD FOR POSITIONING TIRE BEADS

BACKGROUND OF THE INVENTION

The present invention relates to a machine for positioning tyre beads. It also relates to a method using said machine.

The conditions in which tires are required to travel are becoming more and more harsh, and whatever said conditions the beads of a tire have to be positioned correctly on the seats of the mounting rim thereof. The clamping thereof on seats is becoming more and more important, and the mounting of a tire on its rim is becoming more and more difficult, even when mounting machines are used. The poor mounting operations which are observed result in defective positioning of the beads, with the bead seats not bearing on the rim seats over their entire surfaces. These defective positioning operations may cause dislodging of beads if the case arises.

In order to be able to deliver to vehicle manufacturers only mounted assemblies in which the tires have beads which have been correctly positioned, Japanese application 64/03683 describes a method for positioning tire beads which consists in exerting a pressure on the two sidewalls of the inflated tire, so as to detach the beads from the rim flanges and seats, the internal pressure of the tire correctly repositioning them as soon as the pressure force on the sidewalls is removed. The devices provided for applying such a pressure to the sidewalls comprise either two rings, each ring being placed on one side of the tire, or rollers, each roller effecting a circular path on each sidewall of the tire.

Such a device is advantageous when effecting the positioning of tyre beads of the same dimension or at least of tires having maximum axial widths of rotation. Given the multiplicity of dimensions of existing tires and wheels, the increase in the number of dimensions created, and given the multiplicity of structures used in said dimensions and the multiplicity of the stiffness of sidewalls which results therefrom, the known devices do not permit rational, economic use for the finishing of mounted assemblies which can be delivered to the manufacturers.

SUMMARY OF THE INVENTION

In order to overcome the above disadvantages, the machine for correctly positioning the beads of a tire mounted on its operating rim and inflated and using the principle consisting in applying a compressive load to each sidewall of said tire is characterised, according to the invention, in that it comprises two plates, one upper and one lower, respectively, each provided with at least two coaxial cylindrical rings of different diameters and axially movable independently, and also means which, according to the dimension of the tire of the mounted assembly to be treated, permit firstly the selection from among all the upper and lower rings of the appropriate two rings respectively of the upper plate and the lower plate, and secondly the adjustment of the axial distance between the two rings selected, acting on the opposite sidewalls of the tire, which distance is necessary and sufficient for the desired compression of said sidewalls.

"Axial direction" is to be understood to mean the common direction of the axes of the cylindrical rings, which is also the direction of the axis of the mounted assembly to be treated.

The means permitting the selection and adjustment may first and foremost be means for identifying the mounted assembly to be treated. These means may be visual and human, but they may also consist of a reading system which permits the decoding of a code applied to the tire or introduced in the interior of the tire and/or of the rim, or a system permitting the recognition of dimensional measurements.

The device will advantageously comprise a central processing and control unit. The means of this unit for processing the data, obtained by reading, for example, are means for receiving and comparing the data collected with pre-established, stored implementation data of the device. These pre-established data are in particular the identification of the rings which it is necessary to select, and also the axial distance between the lower ring and the upper ring which it is necessary to maintain as a function of the dimension to be treated. The central unit also comprises means permitting the control of the positioning devices for the rings selected with respect to the other rings, and also devices for adjusting the axial distance selected between the rings selected.

The machine according to the invention will advantageously comprise means for feeding and removing the mounted assemblies to be treated, said assemblies being subjected on said means to pre-centering and also to centering relative to the two rings selected by means of a system for centring and holding the mounted assembly.

The method according to the invention intended for the correct positioning of the beads of an inflated tire by means of the device described above is characterised in that:
- the mounted assembly to be treated is identified,
- the lower and upper rings are selected, and the axial distance between the two rings which will have to exist during the compression of the sidewalls of the tire of the mounted assembly,
- the mounted assembly is fed in and centered so that the axis of rotation thereof coincides with the common axis of the lower and upper rings selected, said assembly being held in space by means of the tread of the tire and/or of the wheel,
- the axially upper ring is positioned and the lower ring is displaced axially so as to compress the two sidewalls of the tire for a given time,
- the rings are moved apart, the mounted assembly is laid on the exit table, and the assembly is removed.

The machine according to the invention permits the selection of the lower and upper rings of different diameters, which selection is useful in the event that the tire of the mounted assembly to be treated has sidewalls and/or beads which are asymmetrical, for example in height, and or in the profiles and/or in stiffness, but the selection generally relates to two rings of identical diameters.

DESCRIPTION OF THE DRAWINGS

The characteristics and advantages of the invention will be better understood with reference to the following description, which relates to the drawing illustrating, non-limitatively, an example of the device according to the invention, in which drawing.

DESCRIPTION OF THE PREFERRED EMBODIMENTS

Figure 1:
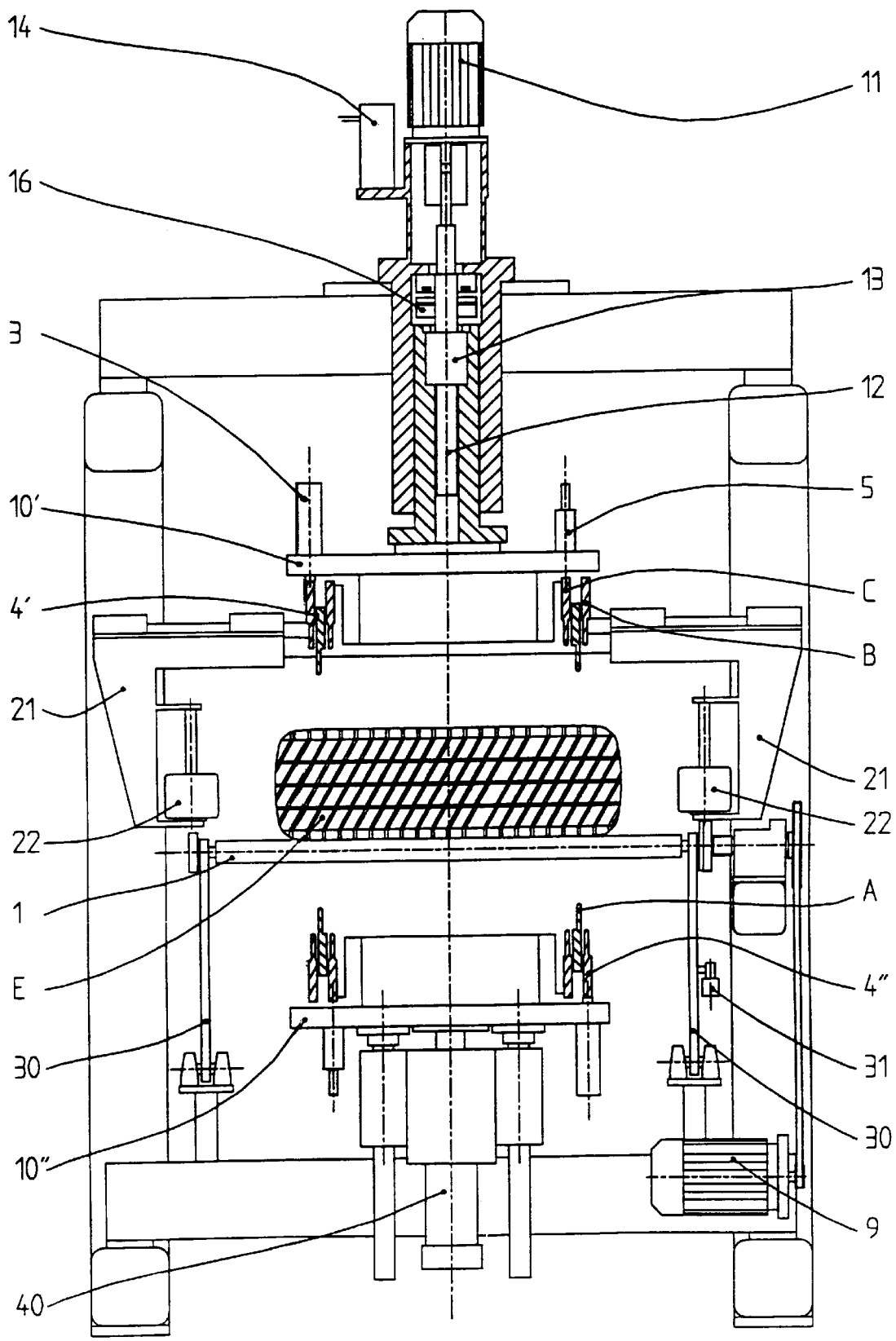
FIG. 1 shows a diagram of a front view of the device.
Figure 2:
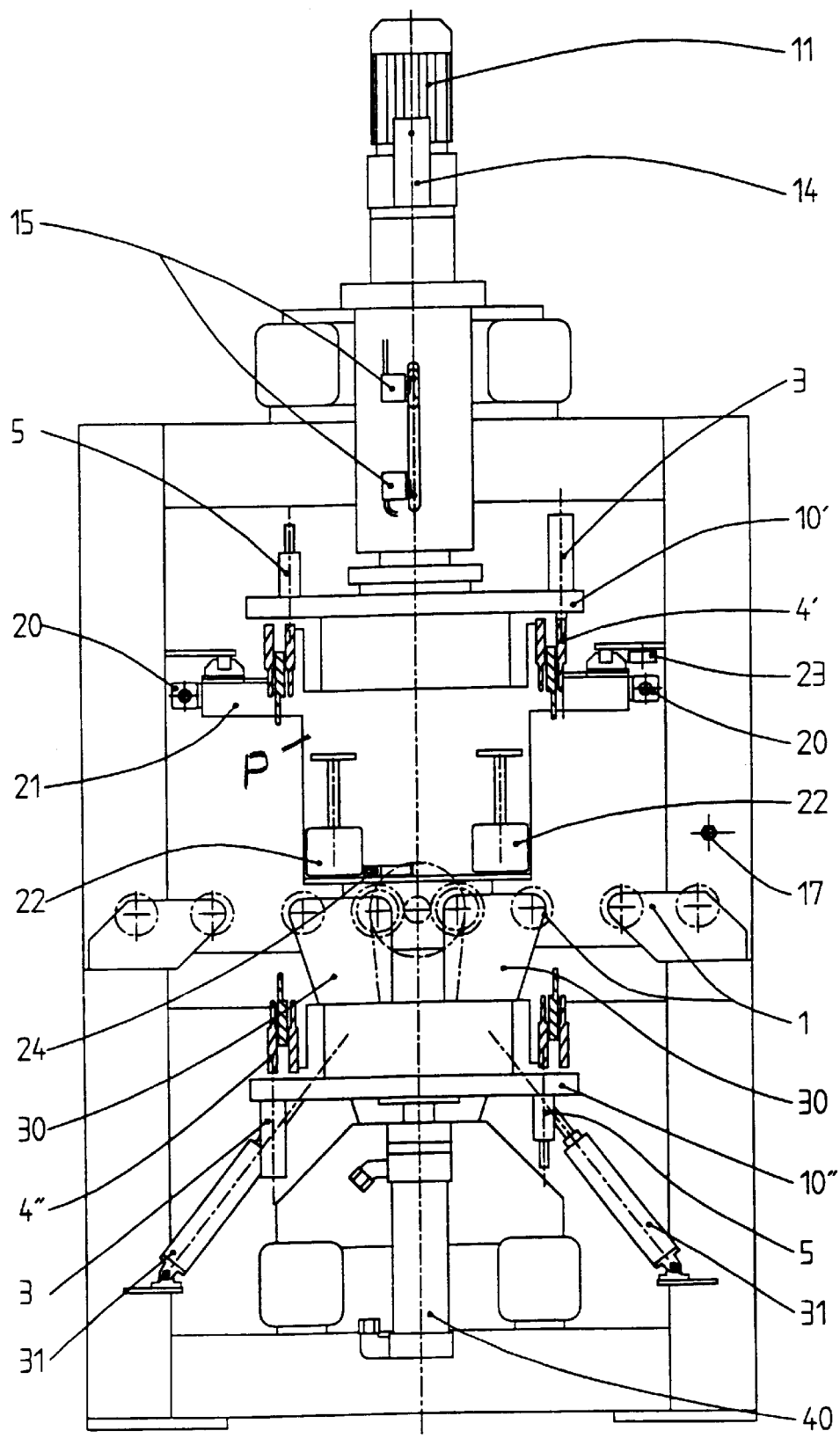
FIG. 2 shows a diagram of a side view of the same device.

The tires are mounted on their respective operating rims, inflated to a pressure greater than their nominal inflation pressures, the value of which may be dictated by the manufacturers concerned, and thus form the mounted assemblies E. Said assemblies E are displaced in a horizontal position on a roller conveyor 1, the rollers being set in motion by an asynchronous motor 9. This conveyor 1 may be provided with a positioning device consisting of two pivoting arms moved by a system of suitably-controlled pneumatic piston-cylinder units, such a device permitting the alignment of the assembly in the longitudinal direction.

The mounted assembly E, with a tire having symmetrical sidewalls in the case described, is identified by a code. The code comprises the information necessary both on the dimensional characteristics of the assembly and on the stiffness characteristics of the sidewalls of the tire, whether this stiffness be structural or pneumatic. In the case of the example described, the code, formed of six numbers, is read by a human operator. It is obvious that any other system of marking and reading said marking may be used: a barcode message may be interpreted optically by a suitable reader consisting of a (laser or infrared) scanner which transforms the reflection of light into electrical signals; a paramagnetic material may be incorporated in or on the tire after having been exposed to a magnetic field, a reading head detects the magnetism retained by each part of material previously used; the recessed and relief markings on a tire sidewall may be optically sensed, after appropriate illumination; the mounted assembly may also be identified by automatic measurement of dimensions such as diameters and/or widths (of the tire, of the wheel).

The code is transferred in the form of a signal to the processing unit or microprocessor-based controller U (not shown), which is programmable and programmed with the aid of suitable software, and which, after comparison with the data stored relating to the three sets of rings A, B, C, upper and lower, sends an electrical signal to the solenoid valves which control the distributors assigned to the 6 pneumatic and electromagnetic piston-cylinder units 3 which serve to operate the vertical displacement of the set A of rings 4 selected. Each ring 4, be it lower or upper, is in actual fact moved by three circumferentially equidistant piston-cylinder units 3. The two rings 4 of the set A selected, which are axially displaced relative to the four rings of the other two sets B and C, are guided in their displacement by guide means which may, as in the example in question, be ball bushings 5.

The processing unit U thus determines the axial distance which there will have to be between the two, lower and upper, rings of the set selected for the correct compression of the two sidewalls of the tire of the treated assembly, according to the code received. "Set of rings A" is to be understood to mean the group of the two rings of identical diameters respectively of the lower plate and of the upper plate, and the axial distance between two rings, one lower and one upper, whatever the sets to which they belong, is measured in the axial direction.

Figure 4:
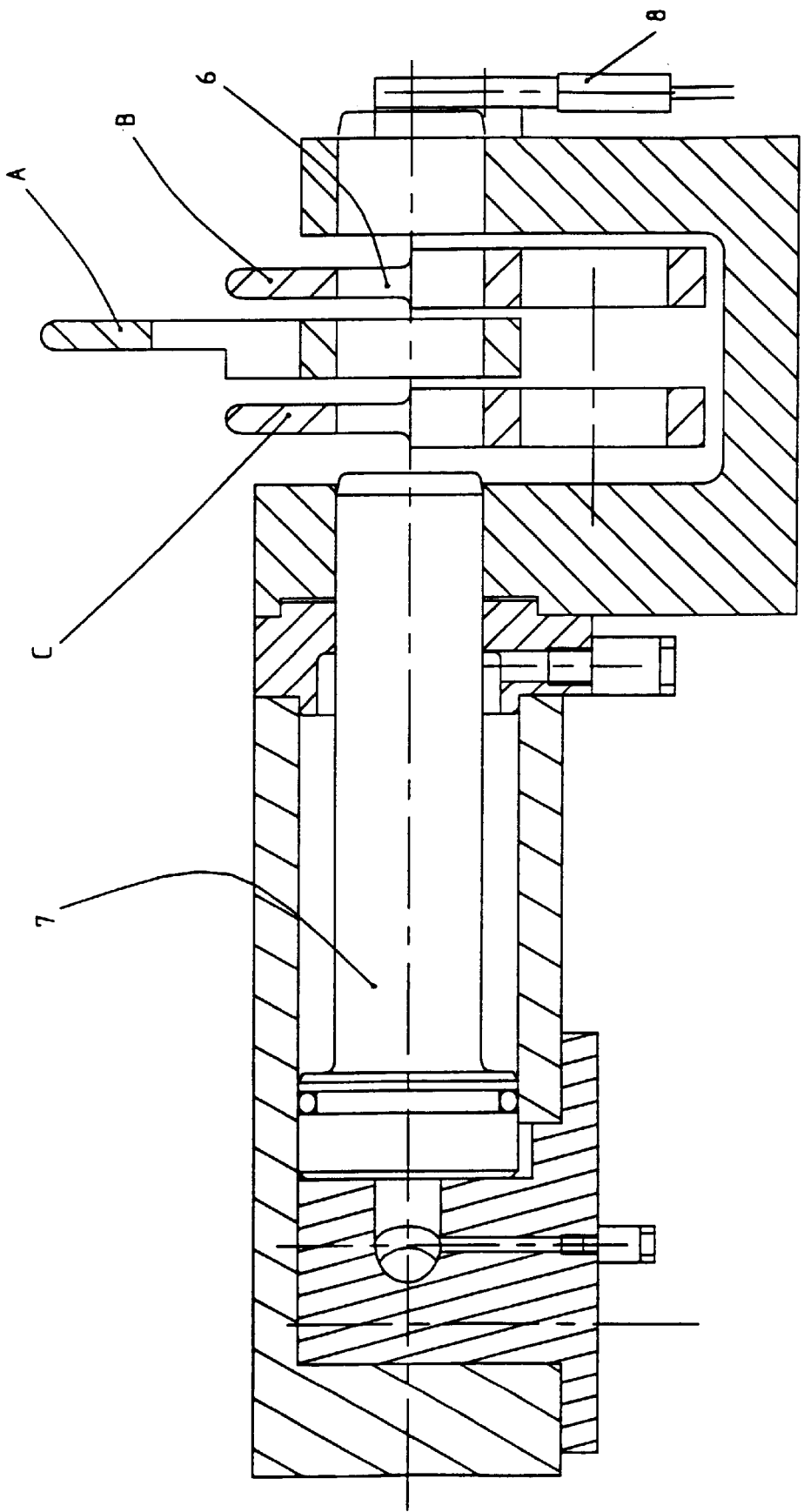
FIG. 4 shows a diagram of the locking of the rings after selection of the appropriate set of rings.

When the suitable set A of rings 4 has been displaced axially relative to the other two by the height sufficient for these two rings 4 only to be able to act on the sidewalls of the tire, all the rings, being provided with locking orifices (6) (FIG. 4) on their periphery, are then locked by means of a set of pneumatic piston-cylinder units 7 (three in number, distributed circumferentially), which penetrate into the orifices (6) provided for this purpose. Magnetic detectors 8 make it possible to check the effectiveness of the locking of the rings.

The means for displacement 3 and guidance 5 of the rings 4 selected are integral with a plate 10, and the upper plate 10', equipped with the three upper rings (4'), is axially adjustable. Given that the lower plate 10", equipped with the three lower rings (4"), covers an axial path of constant distance upon the compression of the sidewalls of the tire, it is the adjustment of the upper plate 10' which makes it possible to obtain the desired distance between rings. The movement of the upper plate is effected by a three-phase asynchronous motor 11, coupled to a screw 12, the pitch of which is 5 mm and which is coupled to a nut 13, permitting the displacement of the upper plate 10'. The supply to the motor 11 is effected by means of a frequency variator, controlled by an analog output of the controller. An absolute encoder 14 permanently checks the position of the upper plate (10'). Two sensors 15 make it possible to limit the displacement of the plate/rings unit, which unit is immobilised by a brake 16 after positioning.

Once the upper plate 10' is in position, as is the upper ring selected, the mounted assembly E is then pre-centered in the longitudinal direction, referred to as being the direction of advance of the assembly on the roller conveyor 1. The assembly E passes in front of a photoelectric cell 17, and it is possible to record the interruption time of the cell. Given the time, at a known constant speed, necessary to cover the longitudinal distance between the cell 17 and the common vertical axis of the rings 4' and 4", the controller U calculates the lead time remaining to be effected after passing completely in front of the cell, and transmits the instruction to the motor for driving the rollers of the conveyor 1, which motor stops as soon as the axis of the mounted assembly E substantially merges with the axis of the rings.

Figure 3:
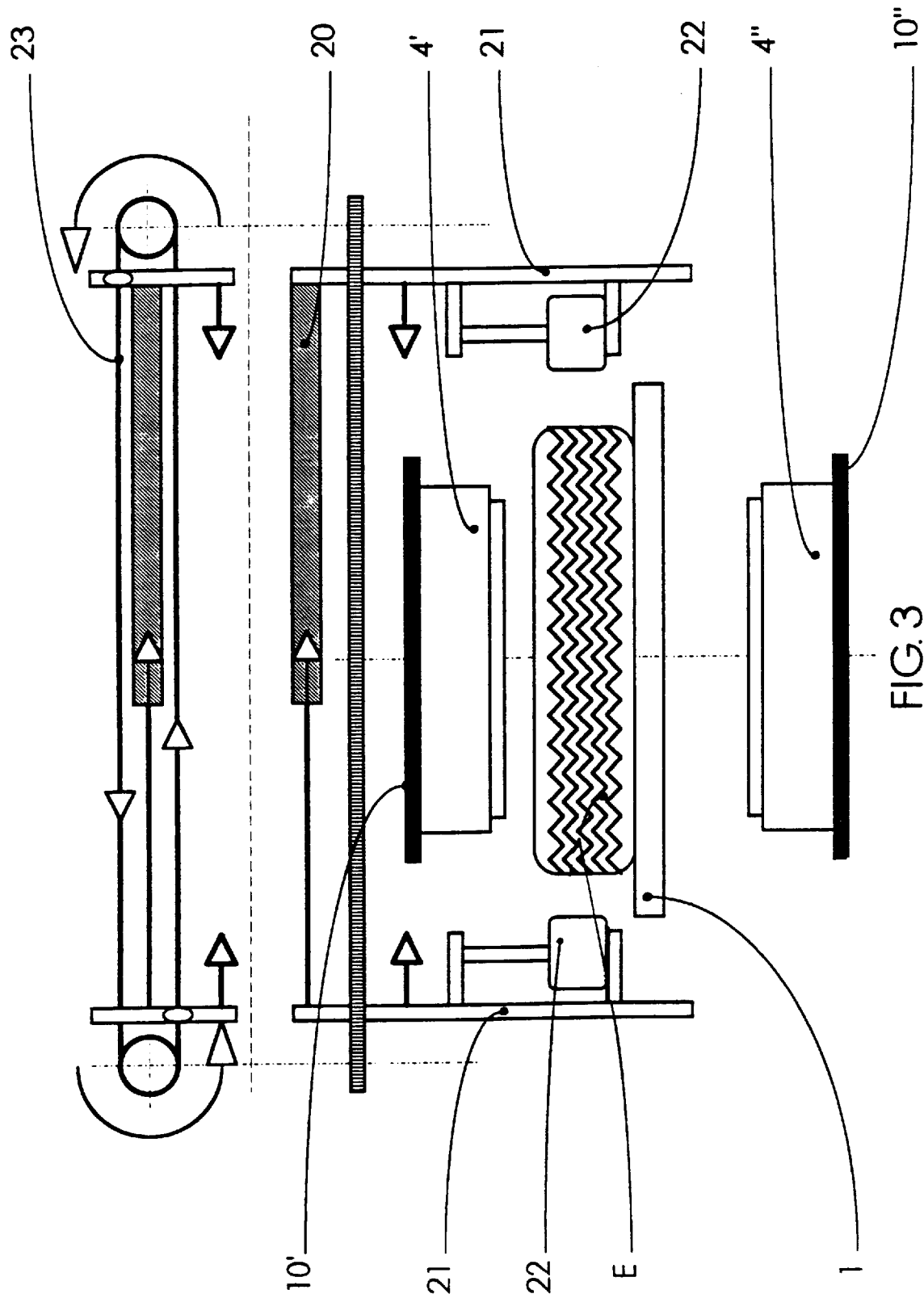
FIG. 3 shows a diagram of the gripping and holding system for the mounted assembly, before the compression of the sidewalls.

The centering proper, which must result in the perfect alignment of the axis of rotation of the mounted assembly E with the axis XX' of the lower 4' and upper 4" rings selected, is obtained by a secondary device for gripping the treated mounted assembly E and holding it in space (FIG. 3). This secondary device or centering clasp P is moved by two pneumatic piston-cylinder units 20 and comprises two supports 21, each of these supports bearing two centring rollers 22. A notched belt 23 connects the two supports 21 and forces the horizontal movements of the rollers 22 to be symmetrical to the axis of the rings. The four rollers 22 surround the mounted assembly E closely by means of the tread so as to be able to hold it in space. Each centering roller 22 is completed by a detector 24 having as its function to note the presence of the mounted assembly: if said assembly is poorly centering, one or more detectors 24 are inoperative and the machine stops.

The controller U then controls the following operation, consisting in lowering part of the roller conveyor 1, said part being located below the assembly E, in order to permit the axial raising of the unit consisting of the lower plate 10" and of these rings 4", the retraction of said part being effected by rotation of the supports 30 of the conveyor 1 by means of piston-cylinder units 31. The mounted assembly E being in position and the path being free, the axial raising of the lower plate 10", to which in particular the lower ring 4" selected is attached, is then effected by means of a hydraulic piston-cylinder unit 40 fed by a local central unit (not shown), comprising a motor which drives a hydraulic pump. The treatment of the mounted assembly E consists in raising the lower plate 10" until it butts against the piston-cylinder unit, whatever the resistance encountered. In fact, the lower cylindrical ring 4" comes into contact with the lower sidewall of the tire, supports the tire/wheel/rollers assembly, displaces it axially until the distance between rings 4 which is controlled by the controller 2 is achieved, the displacement being made possible by the axial mobility of the rollers 22 about their vertical axes. Advantageously, a pressure switch makes it possible to measure the pressure in the thrust system, which pressure is a function of the resistance to depression of the sidewalls of the tyre, which resistance is due to the internal pressure of said tire. Thus it is possible to detect the under-inflation of the treated assembly E and to reject it.

It is obvious that the machine described above is designed to be able to be controlled manually: the retraction and emergence of the rings, the locking and unlocking thereof, the operation of the conveyor, the opening and closing thereof, the centering, raising and lowering of the upper plate and the raising and lowering of the lower plate can be controlled by the operator. The same applies for the displaying of the distance between rings after compression, and for the axial distance which has to be covered by the upper plate, which may be effected by the operator.

It remains obvious that all the operations described for the treatment of the mounted assembly E are then effected in the reverse direction in order to return to the initial state, once the treated assembly has been ejected and before the start of the treatment of a new assembly. In the case of treating a series of assembled tires having the same identification code, the positioning machine makes it possible to retain all the adjustment operations selected.

We claim:

1. A machine for correctly positioning the beads of an assembly of a tire mounted on its operating rim and inflated, and using the principle of applying to each sidewall of said tire a compressive load, comprising two plates, one upper and one lower, each provided with at least two coaxial cylindrical rings of different diameters and being axially movable independently, and means which, according to the dimension of the tire, permit firstly a selection, from among all the upper and lower rings, of an appropriate ring of the upper plate and an appropriate ring of the lower plate, and secondly an adjustment of the required axial distance between the two selected rings for acting on the opposite sidewalls of the tire for applying the desired compression on said sidewalls.

2. A machine according to claim 1, including a positioning device for the selected rings and an adjusting device for adjusting the axial distance between the rings and in which the means permitting the selection and the adjustment comprise means for identifying the tire of the assembly to be treated, a central processing and control unit, which makes it possible to receive the data collected, for comparison with preestablished, stored implementation data of the machine, to identify the rings to be selected and the axial distance to be maintained between the lower ring and the upper ring as a function of the dimension of the tire and to control the positioning device for the selected rings and the adjusting device for adjusting the axial distance between the selected rings.

3. A machine according to claim 2, in which the central processing and control unit is a microprocessor-based controller which is programmable and programmed.

4. A machine according to claim 2, in which the positioning device for the rings comprises at least three pneumatic piston-cylinder units per ring, which permit the axial displacement of the selected rings relative to the other rings, and at least three piston-cylinder units acting horizontally which permit the locking of said selected rings.

5. A machine according to claim 2, in which the adjusting device for adjusting the axial distance between rings includes a nut, a screw and an asynchronous motor for driving the screw, the adjusting device insuring that the upper plate moves the desired axial distance.

6. A machine according to claim 1, including means for feeding and removing the assembly and means for centering the assembly relative to the two selected rings.

7. A machine according to claim 6, in which the centering means comprise two supports and pneumatic piston-cylinder units for displacing the supports, each of said supports bearing two centering rollers, and a notched belt which acts on the rollers to center the assembly relative to the rings.

8. A method for positioning the beads of an assembly of an inflated tire mounted on a rim using the principle of applying a compressive load to each sidewall of said tire, comprising identifying the tire of the assembly to be treated, selecting a lower ring and an upper ring, determining the axial distance that will be required between the two rings for the compression of the sidewalls of the tire of the assembly, feeding and centering the mounted assembly, such that the axis of rotation thereof coincides with the common axis of the lower and upper rings, holding the assembly in space, axially positioning the upper and lower rings relative to the tire so that the rings are separated by the determined axial distance to compress the two sidewalls of the tire for a given time, moving the rings apart, and removing the assembly from between the rings.

* * * * *